(12) United States Patent
Chang

(10) Patent No.: US 8,274,705 B2
(45) Date of Patent: Sep. 25, 2012

(54) MULTI-LEVEL SURROUND ERROR DIFFUSION

(75) Inventor: Ching-Wei Chang, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 852 days.

(21) Appl. No.: 12/412,648

(22) Filed: Mar. 27, 2009

(65) Prior Publication Data

US 2010/0245924 A1   Sep. 30, 2010

(51) Int. Cl.
*H04N 1/40* (2006.01)
(52) U.S. Cl. ............ 358/3.03; 358/3.01; 358/3.02; 358/3.04; 358/3.05; 382/252
(58) Field of Classification Search .............. None
See application file for complete search history.

(56) References Cited

U.S. PATENT DOCUMENTS

| | | | |
|---|---|---|---|
| 5,493,416 A | 2/1996 | Fan | |
| 5,604,605 A | 2/1997 | Moolenaar | |
| 5,692,109 A | 11/1997 | Shu | |
| 5,739,917 A | 4/1998 | Shu et al. | |
| 5,809,177 A | 9/1998 | Metcalfe et al. | |
| 6,026,199 A | 2/2000 | Sommer | |
| 6,072,591 A | 6/2000 | Harrington | |
| 6,271,936 B1 | 8/2001 | Yu et al. | |
| 6,552,824 B2 * | 4/2003 | Rombola et al. | 358/3.14 |
| 6,594,035 B1 * | 7/2003 | Kresch et al. | 358/3.03 |
| 6,671,071 B1 * | 12/2003 | Kletter | 358/1.9 |
| 7,031,514 B1 * | 4/2006 | Shindo | 382/164 |
| 7,265,872 B2 | 9/2007 | Tresser | |
| 7,379,211 B2 | 5/2008 | Ishii et al. | |
| 7,502,140 B2 * | 3/2009 | Yamamura | 358/1.9 |
| 7,701,614 B2 * | 4/2010 | Yamazaki | 358/3.03 |
| 7,961,962 B2 * | 6/2011 | Cittadini et al. | 382/237 |
| 8,009,327 B2 * | 8/2011 | Ishikawa | 358/3.03 |
| 2005/0025374 A1 | 2/2005 | Ishikawa | |
| 2005/0088700 A1 | 4/2005 | Aoki et al. | |
| 2005/0094211 A1 | 5/2005 | Dang | |
| 2005/0122545 A1 | 6/2005 | Ranganathan et al. | |
| 2005/0259884 A1 * | 11/2005 | Murakami et al. | 382/252 |
| 2008/0079959 A1 | 4/2008 | Yamazaki | |
| 2009/0244632 A1 * | 10/2009 | Yoshimura | 358/3.06 |

FOREIGN PATENT DOCUMENTS

| | | | |
|---|---|---|---|
| EP | 1107576 A2 | 6/2001 | |
| EP | 1553754 A1 | 7/2005 | |

OTHER PUBLICATIONS

Notice of Allowance for U.S. Appl. No. 12/412,632, mailed Feb. 17, 2012.

* cited by examiner

*Primary Examiner* — Dung Tran
(74) *Attorney, Agent, or Firm* — Michael Blaine Brooks, P.C.; David Ripma; Pejman Yedidsion

(57) ABSTRACT

Machine-enabled methods of, and system, and processor readable media, embodiments for, tone quantization error diffusion comprising a first stage process and a second stage process. where pre-calibrated index tables may be applied by which quantized pixels may be expressed according to halftones.

11 Claims, 9 Drawing Sheets

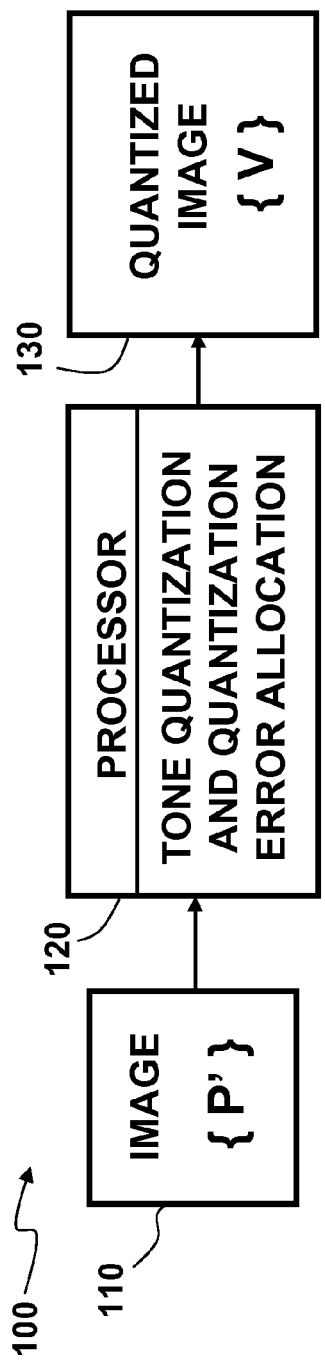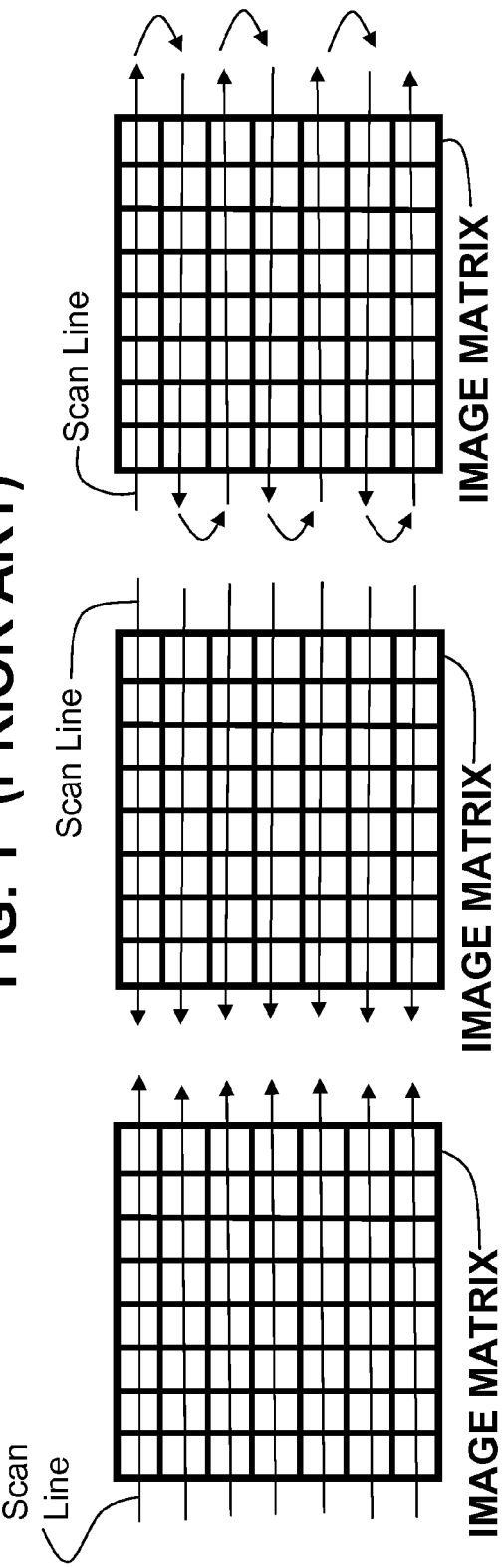

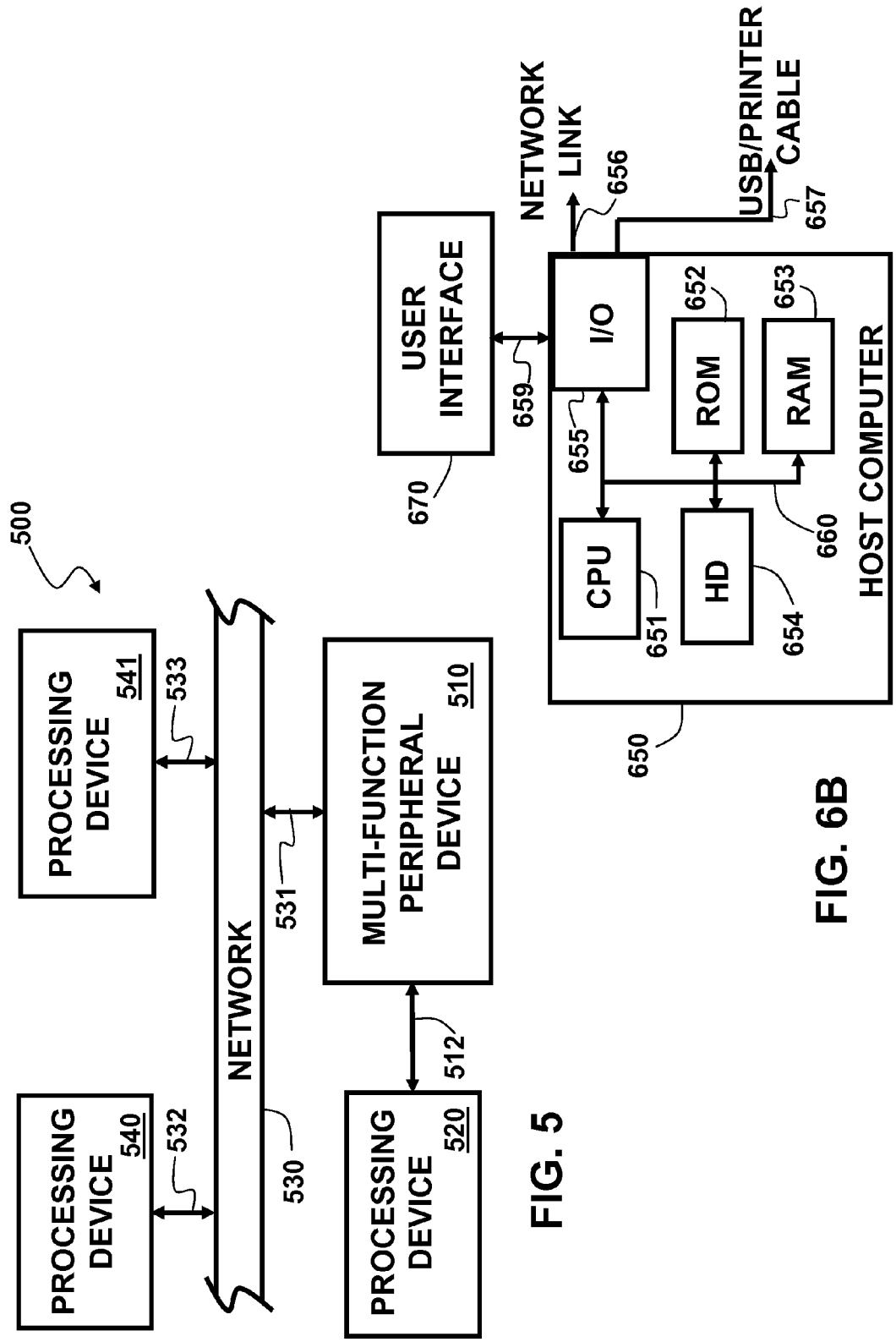

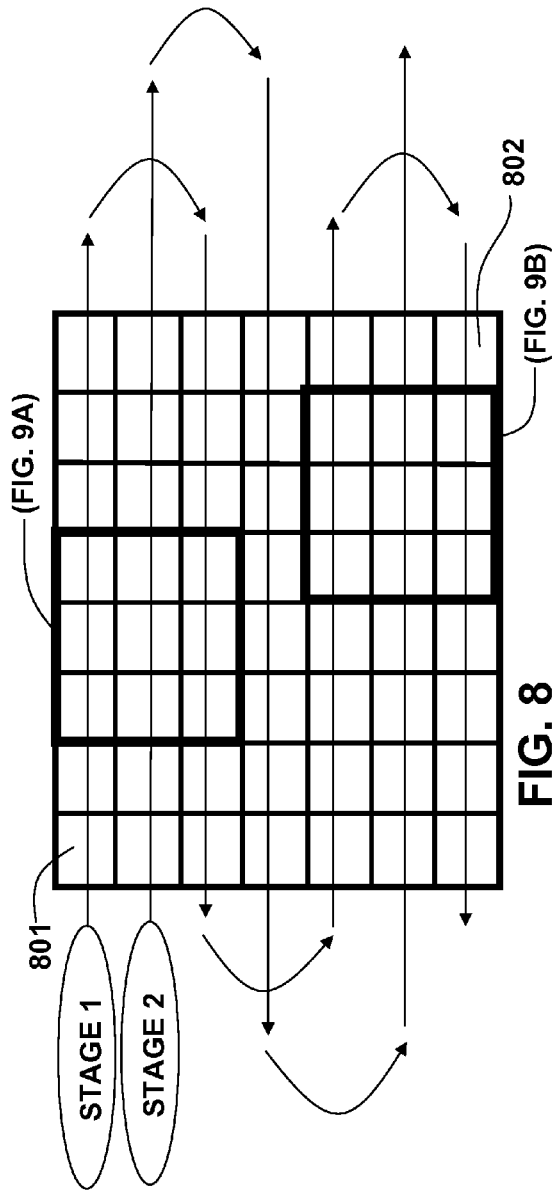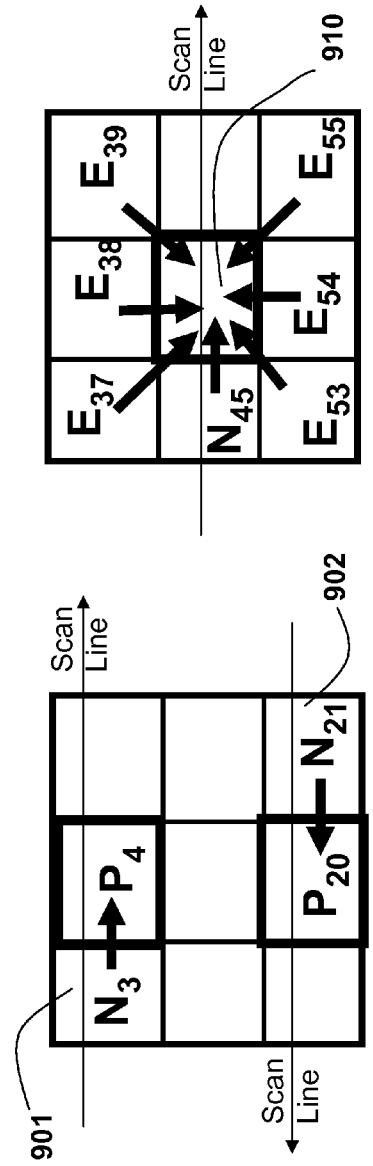
FIG. 8
FIG. 9A
FIG. 9B

MULTI-LEVEL SURROUND ERROR DIFFUSION

CROSS-REFERENCE TO RELATED APPLICATIONS

This application is related to U.S. patent application Ser. No. 12/412,632, titled "Surround Error Diffusion," by Ching-Wei Chang, filed Mar. 27, 2009, which is hereby incorporated herein by reference in its entirety for all purposes.

A portion of the disclosure of this patent document contains material which is subject to (copyright or mask work) protection. The (copyright or mask work) owner has no objection to the facsimile reproduction by any-one of the patent document or the patent disclosure, as it appears in the Patent and Trademark Office patent file or records, but otherwise reserves all (copyright or mask work) rights whatsoever.

FIELD OF ENDEAVOR

The present invention, in its several embodiments, relates to methods, systems and processor readable media for tone quantization error diffusion.

BACKGROUND

A conversion of an image format may result in a restriction in the gradation of expressions of grayscale and/or color component intensity. FIG. 1 is a top-level block diagram of a process 100 where a digital image 110 comprised of pixels having tone levels, {P'}, is provided to a processor 120 configured to execute instructions that quantize the intensity level of each pixel of the digital image, resulting in the possibility of a tone error, i.e., the difference between the provided pixel tone intensity and the quantized tone intensity, for each quantized pixel. In addition to the tone quantization, the processor may allocate the resulting quantized tone error to the tone level of image pixels not yet quantized. The result is a quantized digital image 130 having tone values, {V}, as affected by the input tone levels, the quantization levels and logic, and the allocation of tone error. The tone levels of pixels of a digital image may be expressed in a matrix of rows and columns. A scan line may be defined as a row or column of pixels scanned serially for tone quantization. When a horizontal scanning direction is employed, the horizontal scanning direction may be from right to left or alternate scanning direction between lines. FIG. 2A illustrates an example of right-to-left scanning of a digital image. FIG. 2B illustrates an example of left-to-right scanning of a digital image. FIG. 2C illustrates an example of alternating right-to-left and left-to-right scanning of a digital image. Image dithering may be used to distribute the resulting pixel tone quantization error. Methods such as Floyd-Steinberg dithering achieve image dithering by diffusing the quantization error of a pixel to yet-unscanned neighboring pixels according to a weighted apportionment. The Floyd-Steinberg method typically quantizes the pixels of an image by scanning the image from left-to-right, and top-to-bottom. FIG. 3 shows a portion of an image matrix 300, a three-by-three set of cells or pixels, and an example of a right-to-left scan 310 where the tone value of a pixel, P, is being quantized, and portions 321-324 of the resulting tone quantization error are distributed to the yet-unscanned, i.e., yet-to-be-quantized, nearest neighbors 331-334 of the pixel, P. That is, each quantization cycle of a pixel in a right-to-left scan includes pushing portions of the quantization error to the neighboring pixel on the right and the three nearest neighbors in the next scan line.

FIG. 4 shows a process where a pixel tone value may be defined by its row and column location as $P_{i,j}$, and conceptually may be comprised of a quantized tone value, $V_{i,j}$, and the tone error, $E_{i,j}$, that is, the difference between the original one level and the quantized tone level. So conceptually, $P_{i,j}=V_{i,j}+E_{i,j}$. Based on a determined quantization threshold, $V_{i,j}$ can be established for $P_{i,j}$, as its representation in the quantized tone image. In turn, $E_{i,j}$ is established, i.e., $E_{i,j}$ is assigned the difference between $P_{i,j}$ and $V_{i,j}$, or $E_{i,j} \leftarrow (P_{i,j}-V_{i,j})$, and error diffusion (E.D.) may be effected by the value of $E_{i,j}$ being apportioned according to a weighting scheme to the yet-to-be-quantized nearest neighbors of $P_{i,j}$. Accordingly, the tone error diffusion of $P_{i,j}$ may be propagated as follows: (a) $P_{i,j+1} \leftarrow (P_{i,j+1}-w_1*E_{i,j})$; (b) $P_{i+1,j-1} \leftarrow (P_{i+1,j-1}-w_2*E_{i,j})$; (c) $P_{i+1,j} \leftarrow (P_{i+1,j}-w_3*E_{i,j})$; and (d) $P_{i+1,j+1} \leftarrow (P_{i+1,j+1}-w_4*E_{i,j})$. The Floyd-Steinberg method typically has the values of the weights normalized according to: $w_1=7/16$, $w_2=3/16$, $w_3=5/16$, and $w_4=1/16$.

If halftones are used to express the tone quantized image, the quantized tones for any pixel may be expressed via cells of a matrix, e.g., a two-by-two matrix, each cell having at least a monotone pigment level. The pigmentation of a cell is achieved via the application of a dot of pigment which may bleed into the adjacent cells or may be insufficient to fully pigment a designated cell. By measuring dot intensity of various levels of pixel quantization, a gamma correction vector, may be used to adjust the tone density of half-toned images.

SUMMARY

The present invention includes method, system, and processor readable media, embodiments for tone quantization error diffusion. For example, a machine-enabled method of diffusing tone quantization error of a digital image may comprise: (a) receiving a digital image having input pixel tone levels for one or more color channels according to i rows and j columns; (b) for alternate rows of pixels of the digital image: (1) quantizing an assigned pixel tone level of each pixel, or $S_{i,j}$, per color channel, in series j based on an integer downsizing, wherein the assigned tone level, or $S_{i,j}$, comprises an input tone value, or $P_{i,j}$, and, a partial tone quantization error, or $N_{i,j-1}$, from the last quantized pixel in row i, if present; and (2) determining for each pixel in series j, and per color channel, a total quantization error, or $D_{i,j}$, based on the assigned pixel tone level of the pixel, or $S_{i,j}$, and the quantized assigned pixel tone level of the pixel, or $Q_{i,j}$, wherein the total quantization error, or $D_{i,j}$, comprises a partial tone quantization error, or $N_{i,j}$, and a remainder tone quantization error, or $E_{i,j}$, and (3) storing, per color channel, the remainder tone quantization error, or $E_{i,j}$; and (c) for rows of pixels interposed between the alternate rows of pixels of the digital image: (1) quantizing an assigned pixel tone level of each pixel, or $S_{i,j}$, per color channel, in series j based on an integer downsizing, wherein the assigned tone level, or $S_{i,j}$, comprises: (A) an input tone value, or $P_{i,j}$; (B) a partial tone quantization error, or $N_{i,j-1}$, from the last quantized pixel in row i, if present; and (C) a sum of a weighted remainder tone quantization errors of two or more of the nearest neighbor pixels of the alternate rows comprising the sum: $w_2*E_{i-1,j}+w_5*E_{i+1,j}+w_6*E_{i+1,j+1}$ and, at least one of: (i) the sum: $w_1*E_{i-1,j-1}+w_4*E_{i+1,j-1}$ and (ii) the sum: $w_3*E_{i-1,j+1}+w_6*E_{i+1,j+1}$; and (2) determining, for each pixel in series j, and per color channel, a total quantization error, or $D_{i,j}$, based on the assigned pixel tone level of the pixel, or $S_{i,j}$, and the quantized assigned pixel tone level of the pixel, or $Q_{i,j}$, wherein the total quantization error, or $D_{i,j}$, comprises a partial tone quantization error, or $N_{i,j}$. The integer downsizing of an assigned pixel tone level of the machine-enabled method of diffusing tone quantization error of a digital image may comprise: (a) dividing the assigned pixel tone level of each pixel, or $S_{i,j}$, by $2^B+1$ to generate a quotient having an integer component; (b) adding unity to the integer component of the quotient to generate a quantized tone value; and (c) testing to maintain the quantized tone value at least a value of unity and no more a value than $2^B$; and wherein if the assigned pixel tone level of each pixel, or $S_{i,j}$, is an eight-bit integer, then B=4, and the quantized pixel tone level, or $Q_{i,j}$, is a four-bit integer. Some machine-enabled method embodiments may have the total quantization error, or $D_{i,j}$, being assigned the value of: the assigned pixel tone level of each pixel, or $S_{i,j}$, plus ($2^B+1$), and less the value of the product of quantized pixel tone level, or $Q_{i,j}$, and ($2^B+1$). For the rows of pixels interposed between the alternate rows of pixels of the digital image, embodiments of the quantizing step may comprise quantizing an assigned pixel tone level of each pixel, or $S_{i,j}$, in series j, of row i, based on an integer downsizing, wherein the assigned tone level, or $S_{i,j}$, comprises: (a) an input tone value, or $P_{i,j}$; (b) a partial tone quantization error, or $N_{i,j-1}$, from the last quantized pixel in row i, if present; and (c) if remainder tone quantization errors $E_{i-1,j-1}$, $E_{i+1,j-1}$, $E_{i-1,j+1}$, and $E_{i+1,j+1}$ are present, a sum of weighted remainder tone quantization errors of the nearest neighbor pixels of the alternate rows comprising: the sum: $w_1*E_{i-1,j-1}+w_2*E_{i-1,j}+w_3*E_{i-1,j+1}+w_4*E_{i+1,j-1}+w_5*E_{i-1,j}+w_6*E_{i+1,j+1}$. The method embodiment of diffusing tone quantization error of a digital image may weight remainder tone quantization errors where $w_1=1/8$; $w_2=2/8$; $w_3=1/8$; $w_4=1/8$; $w_5=2/8$; and $w_6=1/8$.

Embodiments of the present invention may include devices and systems. For example, a system for producing image output comprising: a image tone quantization module configured to: (a) input a digital image having input pixel tone levels for one or more color channels according to i rows and j columns; (b) for alternate rows of pixels of the digital image: (1) quantize an assigned pixel tone level of each pixel, or $S_{i,j}$, per color channel, in series j based on an integer downsizing, wherein the assigned tone level, or $S_{i,j}$, comprises an input tone value, or $P_{i,j}$, and, a partial tone quantization error, or $N_{i,j-1}$, from the last quantized pixel in row i, if present; and (2) determine for each pixel in series j, and per color channel, a total quantization error, or $D_{i,j}$, based on the assigned pixel tone level of the pixel, or $S_{i,j}$, and the quantized assigned pixel tone level of the pixel, or $Q_{i,j}$, wherein the total quantization error, or $D_{i,j}$, comprises a partial tone quantization error, or $N_{i,j}$, and a remainder tone quantization error, or $E_{i,j}$, and (3) store, per color channel, the remainder tone quantization error, or $E_{i,j}$; and (c) for rows of pixels interposed between the alternate rows of pixels of the digital image: (1) quantize an assigned pixel tone level of each pixel, or $S_{i,j}$, per color channel, in series j based on an integer downsizing, wherein the assigned tone level, or $S_{i,j}$, comprises: (A) an input tone value, or $P_{i,j}$; (B) a partial tone quantization error, or $N_{i,j-1}$, from the last quantized pixel in row i, if present; and (C) a sum of a weighted remainder tone quantization errors of two or more of the nearest neighbor pixels of the alternate rows comprising the sum: $w_2*E_{i-1,j}+w_5*E_{i+1,j}+w_6*E_{i+1,j+1}$ and, at least one of: (i) the sum: $w_1*E_{i-1,j-1}+w_4*E_{i+1,j-1}$ and (ii) the sum: $w_3*E_{i-1,j+1}+w_6*E_{i+1,j+1}$; and (2) determine, for each pixel in series j, and per color channel, a total quantization error, or $D_{i,j}$, based on the assigned pixel tone level of the pixel, or $S_{i,j}$, and the quantized assigned pixel tone level of the pixel, or $Q_{i,j}$, wherein the total quantization error, or $D_{i,j}$, comprises a partial tone quantization error, or $N_{i,j}$. Some embodiments of the system comprise an image tone quantization module processing the integer downsizing of an assigned pixel tone level that is configured to: (a) divide the assigned pixel tone level of each pixel, or $S_{i,j}$, by $2^B+1$ to generate a quotient having an integer component; (b) add unity to the integer component of the quotient to generate a quantized tone value; and (c) test to maintain the quantized tone value at least a value of unity and no more a value than $2^B$; and wherein if the assigned pixel tone level of each pixel, or $S_{i,j}$, is an eight-bit integer, then B=4, and the quantized pixel tone level, or $Q_{i,j}$, is a four-bit integer. For some system embodiments, the image tone quantization module processing the integer downsizing of an assigned pixel tone level may be further configured to assign the total quantization error, or $D_{i,j}$, the value of: the assigned pixel tone level of each pixel, or $S_{i,j}$, plus ($2^B+1$), and less the value of the product of quantized pixel tone level, or $Q_{i,j}$, and ($2^B+1$).

Embodiments of the present invention include machine-readable medium, particularly computer/processor readable medium having processor executable instructions thereon which, when executed by a processor cause the processor to: (a) input a digital image having input pixel tone levels for one or more color channels according to i rows and j columns; (b) for alternate rows of pixels of the digital image: (1) quantize an assigned pixel tone level of each pixel, or $S_{i,j}$, per color channel, in series j based on an integer downsizing, wherein the assigned tone level, or $S_{i,j}$, comprises an input tone value, or $P_{i,j}$, and, a partial tone quantization error, or $N_{i,j-1}$, from the last quantized pixel in row i, if present; and (2) determine for each pixel in series j, and per color channel, a total quantization error, or $D_{i,j}$, based on the assigned pixel tone level of the pixel, or $S_{i,j}$, and the quantized assigned pixel tone level of the pixel, or $Q_{i,j}$, wherein the total quantization error, or $D_{i,j}$, comprises a partial tone quantization error, or $N_{i,j}$, and a remainder tone quantization error, or $E_{i,j}$, and (3) store, per color channel, the remainder tone quantization error, or $E_{i,j}$; and (c) for rows of pixels interposed between the alternate rows of pixels of the digital image: (1) quantize an assigned pixel tone level of each pixel, or $S_{i,j}$, per color channel, in series j based on an integer downsizing, wherein the assigned tone level, or $S_{i,j}$, comprises: (A) an input tone value, or $P_{i,j}$; (B) a partial tone quantization error, or $N_{i,j-1}$, from the last quantized pixel in row i, if present; and (C) a sum of a weighted remainder tone quantization errors of two or more of the nearest neighbor pixels of the alternate rows comprising the sum: $w_2*E_{i-1,j}+w_5*E_{i+1,j}+w_6*E_{i+1,j+1}$ and, at least one of: (i) the sum: $w_1*E_{i-1,j-1}+w_4*E_{i+1,j-1}$ and (ii) the sum: $w_3*E_{i-1,j+1}+w_6*E_{i+1,j+1}$; and (2) determine, for each pixel in series j, and per color channel, a total quantization error, or $D_{i,j}$, based on the assigned pixel tone level of the pixel, or $S_{i,j}$, and the quantized assigned pixel tone level of the pixel, or $Q_{i,j}$, wherein the total quantization error, or $D_{i,j}$, comprises a partial tone quantization error, or $N_{i,j}$. The processor readable medium embodiments having processor executable instructions thereon, when executed by a processor, may additionally cause the processor to: (a) divide the assigned pixel tone level of each pixel, or $S_{i,j}$, by $2^B+1$ to generate a quotient having an integer component; (b) add unity to the integer component of the quotient to generate a quantized tone value; and (c) test to maintain the quantized tone value at least a value of unity and no more a value than $2^B$; and wherein if the assigned pixel tone level of each pixel, or $S_{i,j}$, is an eight-bit integer, then B=4, and the quantized pixel tone level, or $Q_{i,j}$, is a four-bit integer. The processor readable medium embodiments having processor executable instructions thereon, when executed by a processor, may additionally cause the processor to assign the total quantization error, or $D_{i,j}$, the value of: the assigned pixel tone level of each pixel, or $S_{i,j}$, plus ($2^B+1$), and less the value of the product of quantized pixel tone level, or $Q_{i,j}$, and ($2^B+1$).

BRIEF DESCRIPTION OF THE DRAWINGS

Embodiments of the present invention are illustrated by way of example and not limitation in the figures of the accompanying drawings, and in which:

FIG. 1 is a top-level image tone quantization process functional block diagram;

FIGS. 2A, 2B, and 2C illustrate exemplary scan patterns;

FIG. 5 illustrates, at a top level an exemplary system comprising a plurality of processing devices in communication with a multi-function peripheral (MFP) device;

FIG. 6B illustrates a top level functional block diagram of an exemplary host computer that may host a driver embodiment of the present invention;

FIG. 8 illustrates exemplary scan patterns of the first stage and second stage processing of the present invention;

FIG. 9A illustrates an example of the apportionment of tone quantization error to the tone levels of yet-to-be quantized pixels during the first stage processing;

FIG. 9B illustrates an example of the apportionment of tone quantization error to the tone levels of yet-to-be quantized pixels during the second stage processing;

DETAILED DESCRIPTION

Figures 3, 4:
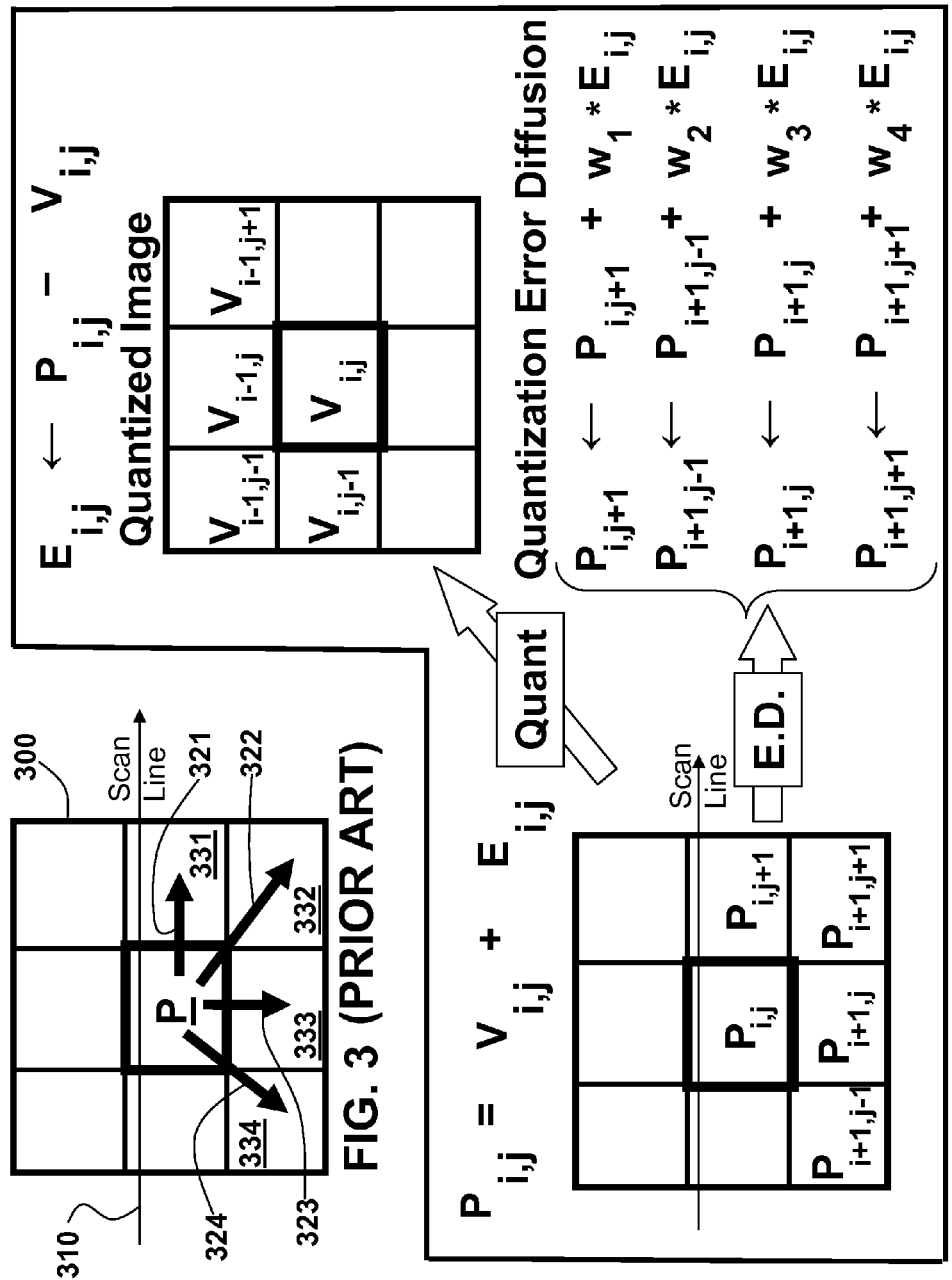
FIG. 3 illustrates apportioning tone quantization error to the tone levels of yet-to-be-quantized pixels.
FIG. 4 illustrates apportioning tone quantization error to the tone levels of yet-to-be-quantized pixels.

FIG. 5 illustrates an exemplary system embodiment 500 of the present invention where a printing device or a multifunctional peripheral (MFP) device 510 may be in direct communication 512 with a processing device 520, such as a computer hosting one or more drivers applicable to the printing device or multi-functional peripheral device 510. In addition, via a network 530 and a network link 531-533, the printing device or a multi-functional peripheral device 510 may be in communication with one or more processing devices 540, 541, such as one or more computers that may each host one or more drivers applicable to the printing device or the MFP device 510.

Figure 6A:
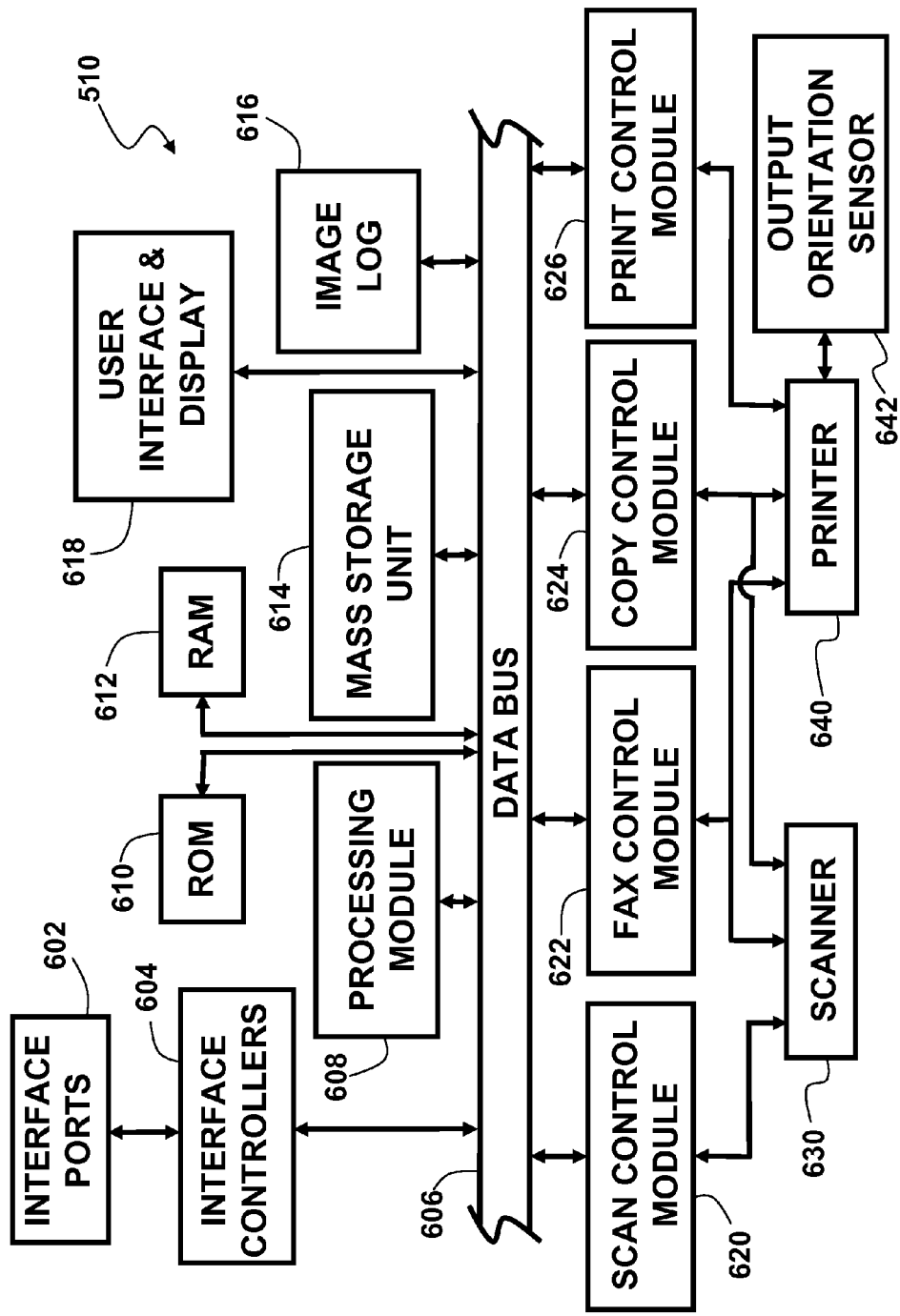
FIG. 6A illustrates a top level functional block diagram of an exemplary MFP device.

The exemplary printing device or MFP device 510 of FIG. 5 may be illustrated in greater exemplary functional detail in FIG. 6A. Interface ports 602 may be present to connect a printer cable, a network link, or an external wireless module. The interface ports 602 may be serviced by one or more interface controllers 604 that function to direct communications and/or condition signals between the respective interface port 602 and one or more modules of the MFP device 510 which may be in common communication via a data bus 606.

The MFP device 510 may include one or more processing modules 608 that may draw data from read-only memory (ROM) 610 and exchange data with random access memory (RAM) 612 and may store files having sizes greater than the RAM 612 capacity in one or more mass storage units 614. The MFP device 510 may maintain a log of its images 616 and have a user display and interface 618. The image log 616 may be a separate module or distributed, for example, with a portion executed via the processing module 608 that may access parameters, files, and/or indices that may be stored in ROM 610, RAM 612, a mass storage unit 614 or in combination thereof The MFP device 510 may include as individual or separate modules a scan control module 620, a facsimile (FAX) control module 622, and a copy control module 624 where each module may service the scanner 630 to direct communications and/or condition signals between the scanner 630 and one or more modules of the MFP device 510, for example, via the data bus 606. The MFP device 510 may include as individual or separate modules the FAX control module 622, the copy control module 624 and a print control module 626 where each module may service the printer 640 to direct communications and/or condition signals between the printer 640 and the one or more modules of the MFP device 510, for example, via the data bus 606. The exemplary MFP device 510 may store a calibration table in ROM 610, RAM 612, a mass storage unit 614 or in combination thereof and accordingly, the calibration table may be accessed by the print control module 626 and/or a processing module 608 and made available to devices external to the MFP device 510 via one or more interface ports 602. The exemplary MFP device 510 may have notice, for example, due to a user input via the user interface 618 or sensed by an output orientation sensor 642 of the printer 640 and may be communicated via the print control module 626 to devices external to the MFP device 510 via one or more interface ports 602. FIG. 6B illustrates a top level functional block diagram of a processing device that is an exemplary host computer 650 that may host a driver embodiment of the present invention that, via an input/output interface 655 may interface 659 with the exemplary MFP of FIG. 6A via a wireless or wired network link 656 or a parallel, serial, or universal serial bus (USB) cable 657. The user interface 670 may include tactile input via keyboard, mouse and/or touch screen and/or audio input via a microphone. The user interface 670 may provide output to the user via a display, e.g., a graphical user interface (GUI), and/or provide audio output to the user via one or more speakers, headphones or ear buds. The host computer 650 may further comprise a central processing unit (CPU) 651, read only memory (ROM) 652, random access memory (RAM) 653 and a mass storage unit 654, such as a hard disk drive (HD). Two or more elements of the host computer 650 may be in communication via a data bus 660. The general accessing of data, processing of data and communication and display of data may be handled at the CPU level of the host computer 650 by an operating system such as MICROSOFT™ WINDOWS™.

Viewing FIGS. 5, 6A, and 6B together, quantization may be performed by a computer 540, 541, 520, 650 in communication 530, 656, 657 with an MFP 510, by the MFP 510, or via a combination of steps distributed between two or more processing units that may include the MFP 510. The resulting images may have a quantized tone level per pixel that is based on a determined or predetermined threshold setting. For example, two-by-two monotone cells may be used as a halftone cell to express five levels of tone. An image region comprises several cells to achieve a resolution such as 300 dpi or 600 dpi. While the ideal tone intensities of one, two, and three pigmented cell may be expected to be 25%, 50%, and 75% respectively, due to pigmentation mechanics, measured tone intensities may be much different, e.g., 60%, 80%, and 92% respectively. Eight-bit expressions of tone levels may equate these measured exemplary results to 153, 204, and 235 respectively, where 255 would be 100%.

Figure 7:
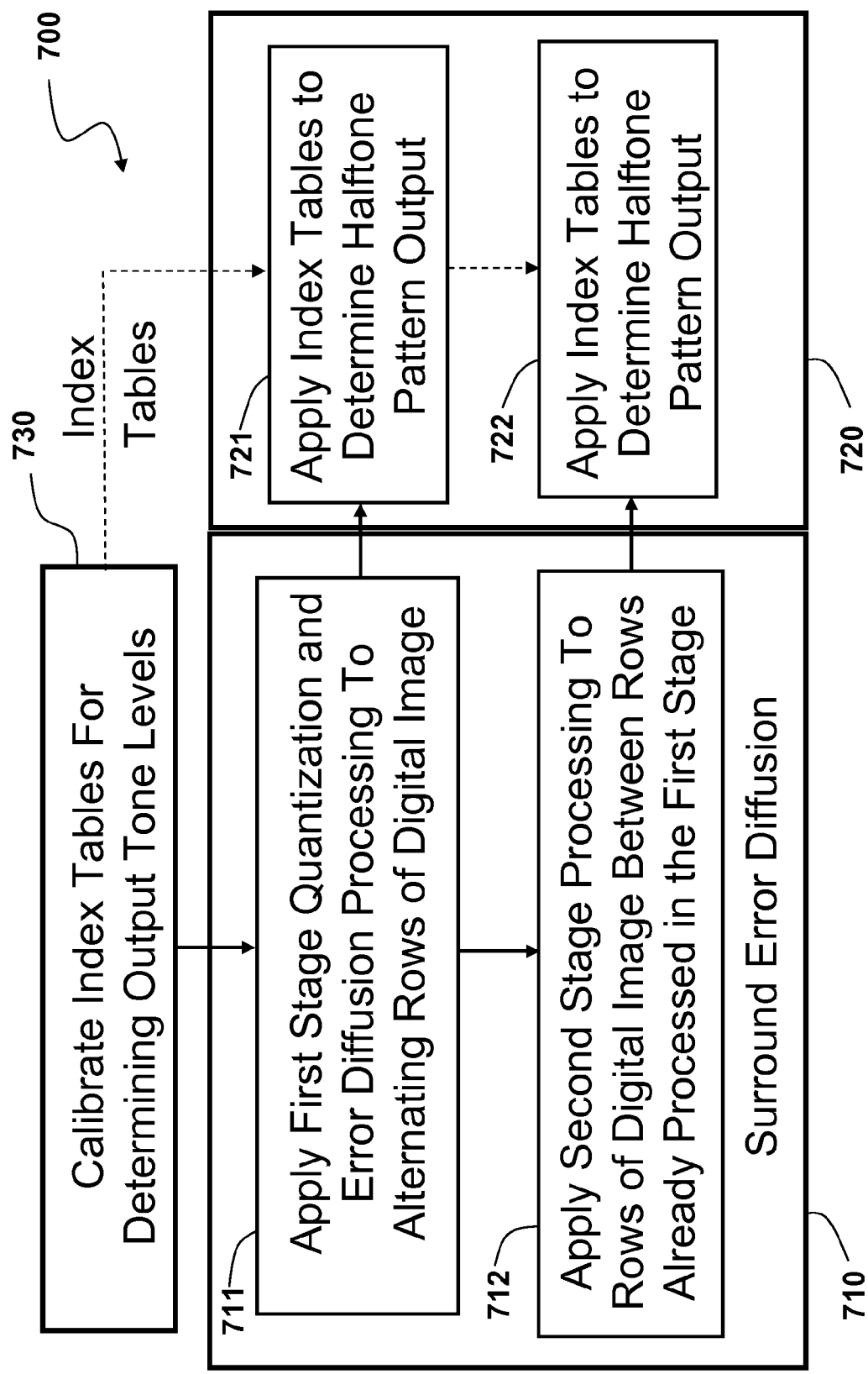
FIG. 7 is a top-level flow chart of a process embodiment of the present invention.

FIG. 7 is a top-level process block diagram 700 of an embodiment of the present invention. The surround error diffusion process 710 is shown comprising a first stage process 711 and a second stage process 712. Also shown is a process 720 of applying pre-calibrated index tables by which quantized pixels may be expressed according to halftones. For example, a pixel density may be expressed by a four-bit output density value having an integer value ranging from 0 to 15. In embodiments where a single input pixel may be rendered as a two-by-two arrangement of pixels for half-toning, the upper left cell may be identified as "W," the upper right cell may be identified as "X," the lower left cell may be identified as "Y," and the lower right cell may be identified as "Z." Based on calibration measurements, calibration tables may be generated to support the determination of pigmenting a particular cell. For example, Table(W) may be comprised of the ordered/indexed set of values: {0 6 8 10 12 14 15 15 15 15 15 15 15 15 15 15 15} indexed according to integer values, e.g., the integer value "16" will return "15" from Table(W) and the integer value "1" will return from Table (W) "0"; Table (X) may be comprised of the ordered/indexed set of values: {0 0 0 0 0 0 1 3 5 7 9 11 13 15 15 15}; Table (Y) may be comprised of the ordered/indexed set of values: {0 0 0 0 0 0 0 0 0 0 0 0 0 0 2 4}; and, if the calibration process determines the lower right cell, Z, may be best left unpigmented, i.e., white, then Table(Z) may be comprised of all zero indexed entries: {0 0 0 0 0 0 0 0 0 0 0 0 0 0 0 0}. Once the quantization and error diffusion is completed for lines scanned according to the first stage 711, the quantized pixels may be indexed 721 to determine their actual output halftone pattern. Once the quantization and error diffusion is completed for lines scanned according to the second stage 712, the quantized pixels may be indexed 722 to determine their actual output halftone pattern. Before the testing, threshold levels for an exemplary five-level halftone output are determined 730 by measuring dot intensities for the output device, e.g., the MFP, at the three intermediate tone levels.

FIG. 8 illustrates an exemplary scanning pattern of the present invention. An exemplary horizontal scanning pattern, i.e., the order and direction of serial tone quantization, of the first stage processing may be every other row of pixels of an image, or every other column according to a vertical scanning pattern. The scanning direction may be right-to-left, left-to-right, or alternate between the two directions, i.e., a serpentine pattern, as shown in FIG. 8. Accordingly, every other row may be skipped, i.e., not quantized, during the first stage processing. An exemplary horizontal pattern of the second stage processing is along the rows interposed between the rows scanned during the first stage. The direction of scanning may be right-to-left, left-to-right, or alternate between the two directions, as shown in FIG. 8. For purposes of illustration, the pixels of the matrix of FIG. 8 are referenced serially, left-to-right, starting with the first pixel 801 that may be also referenced as pixel location no. 1 and the last pixel 802 that may be also referenced as pixel location no. 56.

A portion of FIG. 8 is shown in FIG. 9A where the top or first row is scanned left-to-right. Each pixel may represent multiple colors, e.g., cyan-magenta-yellow-black (CMYK), and have tone levels that are bi-tonal, i.e., having one bit per color channel, or have more than two tone levels, e.g., having two, four or eight bits per color channel. The pixel tone value of a color channel of a pixel 901 in FIG. 9A has been quantized, leaving a quantization tone error, a portion of which, $N_3$, may be added to the pixel tone value of the next pixel, $P_4$, prior to quantization. The second row of FIG. 9A is shown as skipped, for now, and the third row of FIG. 9A is shown as scanned in an opposite direction from the first row, in this example, where the pixel tone value of a color channel of the quantized pixel 902 results in a quantization tone error, a portion of which, $N_{21}$, may be added to the pixel tone value of the next pixel, $P_{20}$, prior to its tone value quantization. Portions of the tone quantization error of the pixels of the first and third rows and tone error not already allocated to the pre-quantized adjacent pixel in the row may be saved for allocation to the rows to be scanned during the second stage of processing. For example, the total tone error associated with the first pixel 901 may be $N_3+E_3$. A portion of FIG. 8 is shown in FIG. 9B where the second or middle row (of FIG. 9B) is scanned left-to-right. Prior to the tone quantization of the center pixel (of FIG. 9B) for a particular color channel, the tone error, $N_{45}$, of the previously quantized pixel in the middle row and portions of the saved tone quantization error from the nearest neighbors of the pixels scanned during the first stage of processing, i.e., portions of $E_{37}$ to $E_{39}$ and $E_{53}$ to $E_{55}$, are added to the yet-unquantized pixel 910.

Figure 10:
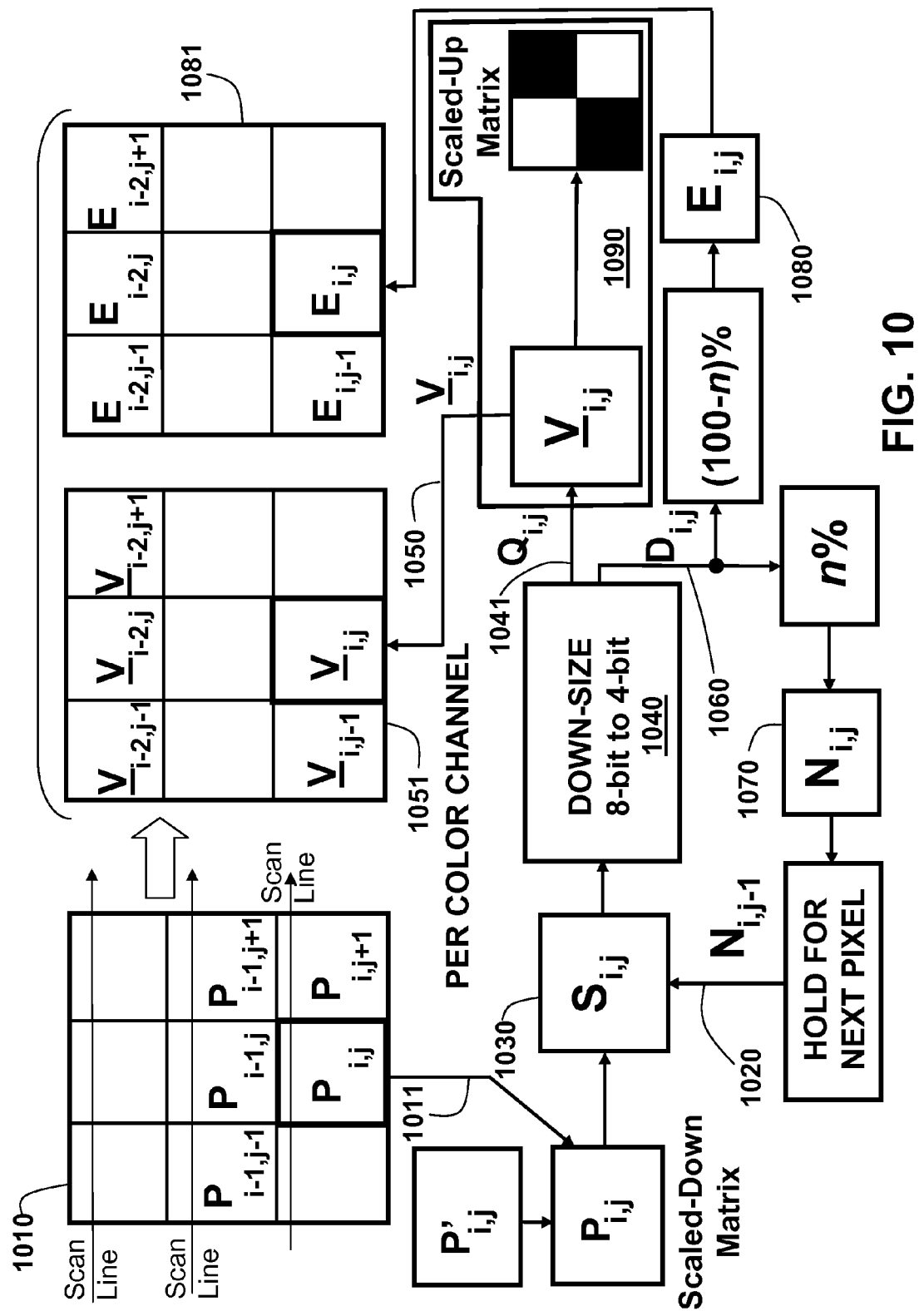
FIG. 10 illustrates an example of the apportionment of tone quantization error to the tone levels of yet-to-be quantized pixels, for a color channel, during the first stage processing.

FIG. 10 illustrates the first stage process in more detail where a pixel having a tone value either not yet quantized or undergoing quantization is shown by the variable P with subscript indicating a row and column location respectively. Accordingly, $P_{i,j}$ 101 is the tone value of a pixel undergoing quantization in the $i^{th}$ row and $j^{th}$ column of the digital image 1010. To facilitate faster processing by reducing total pixels, the digital image may be a scaled-down version of an original digital image, i.e., the image comprising $P_{i,j}$ may be a lower resolution of an image comprising more than one pixel, e.g., $P'_{i,j}$, in place of $P_{i,j}$. A portion of the tone error 1020, $N_{i,j-1}$, from the previously quantized pixel in the exemplary left-to-right scan line is added to the pixel tone value, $P_{i,j}$, to generate a summed value 1030, $S_{i,j}$. This summed valued, e.g., an assigned value of: $S_{i,j} \leftarrow (P_{i,j}+N_{i,j-1})$, may be downsized 1040 from an eight-bit per pixel color channel, e.g., cyan-magenta-yellow-black (CMYK), to a four-bit-per-color-channel expression, e.g, four bits for cyan, four bits for magenta, four bits for yellow, and four bits for black. The downsized value of the assigned or summed value 1030, $S_{i,j}$, becomes a quantized tone value 1041, $Q_{i,j}$ per color channel. The quantized value 1041, $Q_{i,j}$, may provide the index for a process 1090 of applying density tables, e.g., Table(W), Table (X), Table(Y), and Table (Z), for four-bit per channel, two-by-two half-toning. The resulting output values, $V_{i,j}$, per channel, shown collectively, for multiple halftone cell values of a color channel, as $V_{i,j}$ 1050, i.e., when representing more than one pixel, e.g., the four-pixel scale-up for two-by-two half-toning, that may be used to base printer density per cell in the half-toning process 1090. That is, $V_{i,j}$ may be expressed as a set or integer density levels, or $V_{i,j}=\{V_{i,j,W}, V_{i,j,X}, V_{i,j,Y}, V_{i,j,Z}\}$. The quantized image 1051, at its base, then may be comprised of an array of quantized tone values for half-toning, $V_{i,j}$ 1050. The difference between the summed value 1030 and an amplified, biased quantized tone value 1041 may be treated as the total tone error 1060, $D_{i,j}$, e.g., $D_{i,j} \leftarrow (S_{i,j}-\alpha(Q_{i,j}-1))$. A portion, e.g., n%, of the total tone error 1060 may be assigned as a tone value addition 1070, $N_{i,j}$ for the next pixel in the scan line, i.e., $N_{i,j} \leftarrow (n\%*D_{i,j})$. An exemplary embodiment of the first stage processing may have the value of n=50, and so $N_{i,j} \leftarrow 50\%*(S_{i,j}-\alpha(Q_{i,j}-1))=(S_{i,j}-\alpha(Q_{i,j}-1))/2$. In addition, the remainder of the total error, $E_{i,j}$, i.e., the portion not assigned for the next pixel, e.g., (100-n)%, may be saved to a buffer 1081 or memory location corresponding to the presently quantized pixel. For example, $E_{i,j} \leftarrow ((100-n)\% * D_{i,j})$ or $E_{i,j} \leftarrow (D_{i,j} - N_{i,j})$ per color channel. Reference is made to the Appendix section below providing exemplary pseudocode of an embodiment of the present invention.

Figure 11:
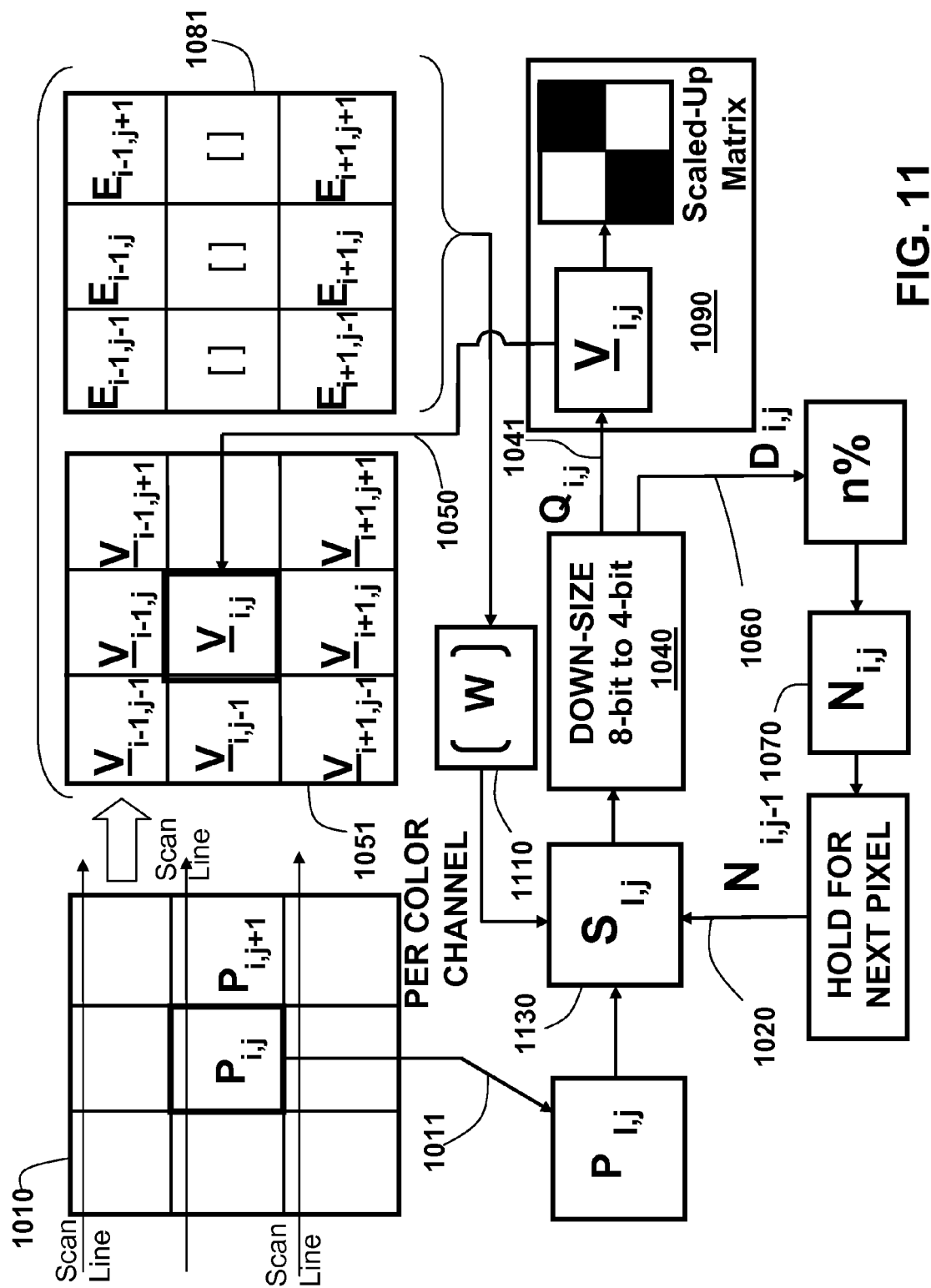
FIG. 11 illustrates an example of the apportionment of tone quantization error to the tone levels of yet-to-be quantized pixels, for a color channel, during the second stage processing.

FIG. 11 illustrates the second stage process in more detail where a pixel having a tone value either not yet quantized or undergoing quantization is shown by the variable P with subscript indicating a row and column location respectively. Accordingly, $P_{i,j}$ 1011 is the tone value of a pixel undergoing quantization in the $i^{th}$ row and $j^{th}$ column of the digital image. A portion of the tone error 1020, $N_{i,j-1}$, from the previously quantized pixel in the exemplary left-to-right scan line is added to the pixel tone value, $P_{i,j}$, and weighted portions 1110 of the error buffer entries from the nearest neighbors of the rows scanned as part of the first stage, are also added to the pixel tone value 1011, $P_{i,j}$, to generate an assigned or summed value 1130, $S_{i,j}$. Weighting values 1110 may be used to combine the remainder of the total error of the row above and row below from the buffer 1081, and the sum of the six weights, e.g., $w_1$ to $w_6$, that may sum to unity. The assigned or summed value 1130, e.g., $S_{i,j} \leftarrow (P_{i,j} + N_{i,j-1} + w_1 * E_{i-1,j-1} + w_2 * E_{i-1,j} + w_3 * E_{i-1,j+1} + w_4 * E_{i+1,j-1} + w_5 * E_{i+1,j} + w_6 * E_{i+1,j+1})$, may be downsized 1040 from an eight-bit per pixel color channel, e.g., cyan-magenta-yellow-black (CMYK), to a four-bit per channel expression. The downsized value of $S_{i,j}$ is shown becoming the quantized tone value 1041, $Q_{i,j}$ per color channel. The quantized tone value 1041, $Q_{i,j}$, may provide the index for the half-toning process 1090, particularly in this example for the density tables, e.g., Table(W), Table (X), Table(Y), and Table (Z), for four-bit per channel, two-by-two half-toning. The resulting output values, $V_{i,j}$, per channel, shown collectively as $\underline{V}_{i,j}$ when representing more than one pixel, e.g., the four-pixel scale-up for two-by-two half-toning, may be used to base printer density per cell in the half-toning process. The difference between the summed value and an amplified, biased quantized tone value may be treated as the total tone error 1060, $D_{i,j}$, e.g., $D_{i,j} \leftarrow (S_{i,j} - \alpha(Q_{i,j} - 1))$. Exemplary values of the weights may be at least one tone error portion from each of the three closest quantized pixels of the immediately adjacent rows and a doubling of that portion for the quantized pixel immediately above and immediately below the pixel being quantized according to the second stage process. So, examples of the weights may be: $w_1 = 1/8$; $w_2 = 2/8$; $w_3 = 1/8$; $w_4 = 1/8$; $w_5 = 2/8$; and $w_6 = 1/8$. A portion, e.g., n %, of the total tone error may be assigned as a tone value addition for the next pixel in the scan line, i.e., $N_{i,j} \leftarrow (n \% * D_{i,j})$.

Figure 12:
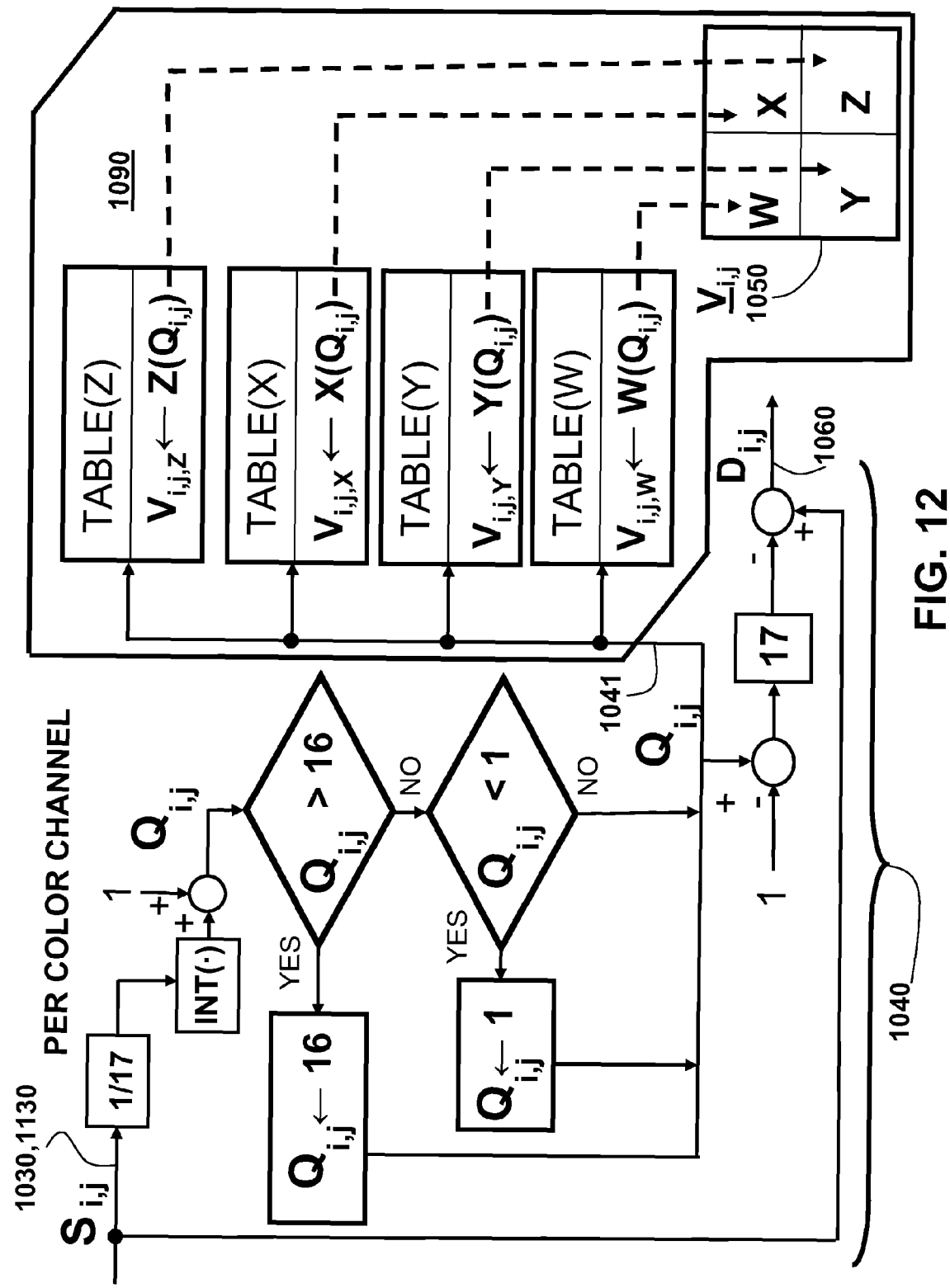
FIG. 12 illustrates an example of the process for scaling from eight bits to four bits and applying indexed density tables for a two-by-two half-tone scale up, for a color channel.

FIG. 12 illustrates an exemplary downsizing of the assigned or summed tone value 1030, 1130, $S_{i,j}$, from eight bits to four bits. For each color channel, the total tone error 1060, $D_{i,j}$, e.g., $D_{i,j} \leftarrow (S_{i,j} - \alpha(Q_{i,j} - 1))$ may be determined in this exemplary flowchart where $\alpha = 17$, an amplifying gain comporting with the particular scale of downsizing from S to Q, i.e., from eight bits to four bits. The quantized tone value 1041, $Q_{i,j}$, is shown being used as an index in this example for the four indexed tables of pigment density. Returning to the exemplary table values of FIG. 7: Table(W) may be an ordered/indexed set of values: {0 6 8 10 12 14 15 15 15 15 15 15 15 15 15 15}; Table (X) may be an ordered/indexed set of values: {0 0 0 0 0 0 1 3 5 7 9 11 13 15 15 15}; Table (Y) may be an ordered/indexed set of values: {0 0 0 0 0 0 0 0 0 0 0 0 0 0 2 4}; and Table(Z) may be a set of zeros: {0 0 0 0 0 0 0 0 0 0 0 0 0 0 0 0}. So, if the quantized value 1041, $Q_{i,j}$, is the value of 6, then the Table(W) will return a value of "14," i.e., $V_{i,j,W} \leftarrow 14$, the Table(X), Table(Y), and Table(Z) will each return a values of zero, i.e., $V_{i,j,X} \leftarrow 0$, $V_{i,j,Y} \leftarrow 0$, and $V_{i,j,Z} \leftarrow 0$, or the two-by-two halftone set 1050 may be assigned as $\underline{V}_{i,j} \leftarrow \{14\ 0\ 0\ 0\}$. Accordingly, the two-by-two matrix for half-toning will only have pigment in the "W" cell for the particular color channel being processed. In like fashion, a quantized value of 15 will return a value of "15" from Table (W), a value of "15" from Table(X), a value of 2 from Table (Y), and a value of 0 from Table (Z). The two-by-two matrix for half-toning of $\underline{V}_{i,j} \leftarrow \{15\ 15\ 2\ 0\}$ in this example would be expected to have heavy pigment density in the "W" cell and the "X" cell, a light pigment density in the "Y" cell, and no pigment in the "Z" cell.

One of ordinary skill in the art will appreciate that the elements, modules, and functions described herein may be further subdivided, combined, and/or varied and yet still be in the spirit of the embodiments of the invention. In addition, while a number of variations of the invention have been shown and described in detail, other modifications, which are within the scope of this invention, will be readily apparent to those of ordinary skill in the art based upon this disclosure, e.g., the exemplary flowcharts or processes described herein may be modified and varied and yet still be in the spirit of the invention. It is also contemplated that various combinations or subcombinations of the specific features and aspects of the embodiments may be made and still fall within the scope of the invention. Accordingly, it should be understood that various features and aspects of the disclosed embodiments may be combined with or substituted for one another in order to form varying modes of the disclosed invention. Thus, it is intended that the scope of the present invention herein disclosed should not be limited by the particular disclosed embodiments described above.

Appendix:

The following comprises pseudocode of an exemplary embodiment of the present invention (where the text of line, separated by and following the "%" symbol is included as explanatory comment):

```
% Multi-Level Surround Error Diffusion (SED)
%
% Copyright 2009 Sharp Labs of America
% Embodiment: 4-bit output
% palettizing
im=imread(filename_in);
[M,N,P]=size(im);
% out=zeros(M,N,'uint16');
eout=zeros(M*2,N*2,4,'uint8');
er=zeros(M,N,4,'int16');    % error buffer
% Table design:
% one input pixel will render 2 x 2 output pixels
```

| W | X |
|---|---|
| Y | Z |

```
% unlike 1-bit, i.e., bi-tonal, SED, each pixel can have 4-bit output
density levels,
% from 0 to 15.
% Based on experiment, some low density levels are not stable in the
printing processes,
% so we should not use them for an isolated single pixel. So pixel w
starts from level 6.
% Based on tone level pattern testing measurements, tables are
designed as below:
wtab=[0 6 8 10 12 14 15 15 15 15 15 15 15 15 15 15];
xtab=[0 0 0 0 0 0 1 3 5 7 9 11 13 15 15 15];
ytab=[0 0 0 0 0 0 0 0 0 0 0 0 0 0 2 4];
% pixel w starts from level 6
% pixel x is the second pixel to turn on
% pixel y only turn on when the density is very high
% pixel z always left in white to avoid high dot gain due to high frequency
cc=0;
zz=[0 0 0 0];
% count row numbers
if (mod(M,2)>0)
    m2=M/2;
    m1=m2+1;
```

-continued

```
else
    m1=M/2;
    m2=m1-1;
    cc=1;
end
% first time
for i=1:m1
    kk=i*2-1;
    nn=[0 0 0 0];
    for j=1:N
        cmyk = double(reshape(im(kk,j,:),[1,4]));
        for k=1:4
            x=cmyk(k);
            x=x+nn(k);
            y=int16(x/17)+1; % use division to downsize
            the 8-bit data to 4-bit tone levels
            if y>16
                y=16;
            elseif y<1
                y=1;
            end
            ww(k)=wtab(y);
            xx(k)=xtab(y);
            yy(k)=ytab(y);
            zz(k)=0;
            nn(k)=(x-(y-1)*17)/2;
            er(kk,j,k)=nn(k);
        end
        eout(kk*2-1,j*2-1,:)=reshape(ww,[1,1,4]);
        eout(kk*2-1,j*2,:)=reshape(xx,[1,1,4]);
        eout(kk*2,j*2-1,:)=reshape(yy,[1,1,4]);
        eout(kk*2,j*2,:)=reshape(zz,[1,1,4]);
    end
end
% second time
for i=1:m2
    kk=i*2;
    cmyk = double(reshape(im(kk,1,:),[1,4]));
    %j=1 //code skipped
    %j=2~N-1
    for j=2:(N-1)
        cmyk = double(reshape(im(kk,j,:),[1,4]));
        for k=1:4
            x=cmyk(k);
            x=x+nn(k)+double(er(kk-1,j-1,k)+2*er(kk-1,j,k)+
er(kk-1,j+1,k)+er(kk+1,j-1,k)+2*er(kk+1,j,k)+er(kk+1,j+1,k))/8;
            y=int16(x/17)+1;
            if y>16
                y=16;
            elseif y<1
                y=1;
            end
            ww(k)=wtab(y);
            xx(k)=xtab(y);
            yy(k)=ytab(y);
            nn(k)=(x-(y-1)*17)/2;
            er(kk+1,j,k)=er(kk+1,j,k)+nn(k);
        end
        eout(kk*2-1,j*2-1,:)=reshape(ww,[1,1,4]);
        eout(kk*2-1,j*2,:)=reshape(xx,[1,1,4]);
        eout(kk*2,j*2-1,:)=reshape(yy,[1,1,4]);
        eout(kk*2,j*2,:)=reshape(zz,[1,1,4]);
    end
    % j=N //code skipped
% last scanline //code skipped
```

What is claimed is:

1. A method of diffusing tone quantization error of a digital image comprising:

receiving a digital image having input pixel tone levels for one or more color channels according to i rows and j columns;

for alternate rows of pixels of the digital image:

quantizing an assigned pixel tone level of each pixel, or $S_{i,j}$, per color channel, in series j based on an integer downsizing, wherein the assigned tone level, or $S_{i,j}$, comprises an input tone value, or $P_{i,j}$, and, a partial tone quantization error, or $N_{i,j-1}$, from the last quantized pixel in row i, if present; and determining for each pixel in series j of the alternate rows of pixels, and per color channel, a total quantization error, or $D_{i,j}$, based on the assigned pixel tone level of the pixel, or $S_{i,j}$, and the quantized assigned pixel tone level of the pixel, or $Q_{i,j}$, wherein the total quantization error, or $D_{i,j}$, comprises a partial tone quantization error, or $N_{i,j}$, and a remainder tone quantization error, or $E_{i,j}$; and storing, per color channel, the remainder tone quantization error, or $E_{i,j}$; and for rows of pixels interposed between the alternate rows of pixels of the digital image:

quantizing an assigned pixel tone level of each pixel, or $S_{i,j}$, per color channel, in series j based on an integer downsizing, wherein the assigned tone level, or $S_{i,j}$, comprises: (a) an input tone value, or $P_{i,j}$; (b) a partial tone quantization error, or $N_{i,j-1}$, from the last quantized pixel in row i, if present; and (c) a sum of a weighted remainder tone quantization errors of two or more of the nearest neighbor pixels of the alternate rows comprising the sum: $w_2*E_{i-1,j}+w_5*E_{i+1,j}+w_6*E_{i+1,j+1}$ and, at least one of: (i) the sum: $w_1*E_{i-1,j-1}+w_4*E_{i-1,j-1}$ and (ii) the sum: $w_3*E_{i-1,j+1}+w_6*E_{i+1,j+1}$, wherein $w_1, w_2, w_3, w_4, w_5$, and $w_6$, are weighted apportionments given to a set of tone quantization error remainders; and determining, for each pixel in series j of the rows of pixels interposed between the alternate rows of pixels, and per color channel, a total quantization error, or $D_{i,j}$, based on the assigned pixel tone level of the pixel, or $S_{i,j}$, and the quantized assigned pixel tone level of the pixel, or $Q_{i,j}$, wherein the total quantization error, or $D_{i,j}$, comprises a partial tone quantization error, or $N_{i,j}$.

2. The method of diffusing tone quantization error of a digital image of claim 1 wherein the integer downsizing of an assigned pixel tone level comprises:

dividing the assigned pixel tone level of each pixel, or $S_{i,j}$, by $2^B+1$ to generate a quotient having an integer component, wherein $2^B$ indicates a binary integer of length B, and wherein B is an integer value;

adding unity to the integer component of the quotient to generate a quantized tone value; and testing to maintain the quantized tone value at least a value of unity and no more a value than $2^B$; and wherein if the assigned pixel tone level of each pixel, or $S_{i,j}$, is an eight-bit integer, then B=4, and the quantized pixel tone level, or $Q_{i,j}$, is a four-bit integer.

3. The method of diffusing tone quantization error of a digital image of claim 2 wherein the total quantization error, or $D_{i,j}$, of the alternate rows of pixels, and the total quantization error, or $D_{i,j}$, of the rows of pixels interposed between the alternate rows of pixels are assigned the value of: the assigned pixel tone level of each pixel, or $S_{i,j}$, plus $(2^B+1)$, and less the value of the product of quantized pixel tone level, or $Q_{i,j}$, and $(2^B+1)$.

4. The method of diffusing tone quantization error of a digital image of claim 1 wherein for rows of pixels interposed between the alternate rows of pixels of the digital image, the quantizing step comprises:

quantizing an assigned pixel tone level of each pixel, or $S_{i,j}$, in series j, of row i, based on an integer downsizing, wherein the assigned tone level, or $S_j$, comprises: (a) an input tone value, or $P_{i,j}$; (b) a partial tone quantization error, or $N_{i,j-1}$, from the last quantized pixel in row i, if present; and (c) if remainder tone quantization errors $E_{i-1,j-1}$, $E_{i+1,j-1}$, $E_{i-1,j+1}$, and $E_{i+1,j+1}$ are present, a sum of weighted remainder tone quantization errors of the nearest neighbor pixels of the alternate rows comprising: the sum: $w_1*E_{i-1,j-1}+w_2*E_{i-1,j}+w_3*E_{i-1,j+1}+w_4*E_{i+1,j-1}+w_5*E_{i+1,j}+w_6*E_{i+1,j+1}$.

5. The method of diffusing tone quantization error of a digital image of claim 1 wherein $w_1=⅛$; $w_2=2/8$; $w_3=⅛$; $w_4=⅛$; $w_5=2/8$; and $w_6=⅛$.

6. A system for producing image output comprising: a image tone quantization module configured to:
   input a digital image having input pixel tone levels for one or more color channels according to i rows and j columns;
   for alternate rows of pixels of the digital image:
      quantize an assigned pixel tone level of each pixel, or $S_{i,j}$, per color channel, in series j based on an integer downsizing, wherein the assigned tone level, or $S_{i,j}$, comprises an input tone value, or $P_{i,j}$, and, a partial tone quantization error, or $N_{i,j-1}$, from the last quantized pixel in row i, if present; and
      determine for each pixel in series j, and per color channel, a total quantization error, or $D_{i,j}$, based on the assigned pixel tone level of the pixel, or $S_{i,j}$, and the quantized assigned pixel tone level of the pixel, or $Q_{i,j}$, wherein the total quantization error, or $D_{i,j}$, comprises a partial tone quantization error, or $N_{i,j}$, and a remainder tone quantization error, or $E_{i,j}$; and
      store, per color channel, the remainder tone quantization error, or $E_{i,j}$; and
   for rows of pixels interposed between the alternate rows of pixels of the digital image:
      quantize an assigned pixel tone level of each pixel, or $S_{i,j}$, per color channel, in series j based on an integer downsizing, wherein the assigned tone level, or S comprises:
         (a) an input tone value, or $P_{i,j}$; (b) a partial tone quantization error, or $N_{i,j-1}$, from the last quantized pixel in row i, if present; and (c) a sum of a weighted remainder tone quantization errors of two or more of the nearest neighbor pixels of the alternate rows comprising the sum: $w_2*E_{i-1,j}+w_5*E_{i+1,j}+w_6*E_{i+1,j+1}$ and, at least one of: (i) the sum: $w_1*E_{i-1,j-1}+w_4*E_{i+1,j-1}$; and (ii) the sum: $w_3*E_{i-1,j+1}+w_6*E_{i+1,j+1}$, wherein $w_1,w_2,w_3,w_4,w_5$, and $w_6$, are weighted apportionments given to a set of tone quantization error remainders; and
      determine, for each pixel in series j, and per color channel, a total quantization error, or $D_{i,j}$, based on the assigned pixel tone level of the pixel, or $S_{i,j}$, and the quantized assigned pixel tone level of the pixel, or $Q_{i,j}$, wherein the total quantization error, or $D_{i,j}$, comprises a partial tone quantization error, or $N_{i,j}$.

7. The image tone quantization module of the system for producing image output of claim 6 wherein the image tone quantization module processing the integer downsizing of an assigned pixel tone level is configured to:
   divide the assigned pixel tone level of each pixel, or $S_{i,j}$, by $2^B+1$ to generate a quotient having an integer component, wherein $2^B$ indicates a binary integer of length B, and wherein B is an integer value;
   add unity to the integer component of the quotient to generate a quantized tone value; and
   test to maintain the quantized tone value at least a value of unity and no more a value than $2^B$; and wherein if the assigned pixel tone level of each pixel, or $S_{i,j}$, is an eight-bit integer, then B=4, and the quantized pixel tone level, or $Q_{i,j}$, is a four-bit integer.

8. The image tone quantization module of the system for producing image output of claim 7 wherein the image tone quantization module processing the integer downsizing of an assigned pixel tone level is further configured to assign the total quantization error, or $D_{i,j}$, the value of: the assigned pixel tone level of each pixel, or $S_{i,j}$, plus $(2^B+1)$, and less the value of the product of quantized pixel tone level, or $Q_{i,j}$, and $(2^B+1)$.

9. A processor readable non-transitory medium having processor executable instructions thereon which, when executed by a processor cause the processor to:
   input a digital image having input pixel tone levels for one or more color channels according to i rows and j columns;
   for alternate rows of pixels of the digital image:
      quantize an assigned pixel tone level of each pixel, or $S_{i,j}$, per color channel, in series j based on an integer downsizing, wherein the assigned tone level, or S comprises an input tone value, or $P_{i,j}$, and, a partial tone quantization error, or $N_{i,j-1}$, from the last quantized pixel in row i, if present; and
      determine for each pixel in series j, and per color channel, a total quantization error, or $D_{i,j}$, based on the assigned pixel tone level of the pixel, or S and the quantized assigned pixel tone level of the pixel, or $Q_{i,j}$, wherein the total quantization error, or $D_{i,j}$, comprises a partial tone quantization error, or $N_{i,j}$, and a remainder tone quantization error, or $E_{i,j}$; and
      store, per color channel, the remainder tone quantization error, or $E_{i,j}$; and
   for rows of pixels interposed between the alternate rows of pixels of the digital image:
      quantize an assigned pixel tone level of each pixel, or $S_{i,j}$, per color channel, in series j based on an integer downsizing, wherein the assigned tone level, or S comprises: (a) an input tone value, or $P_{i,j}$; (b) a partial tone quantization error, or $N_{i,j-1}$, from the last quantized pixel in row i, if present; and (c) a sum of a weighted remainder tone quantization errors of two or more of the nearest neighbor pixels of the alternate rows comprising the sum: $w_2*E_{i-1,j}+w_5*E_{i+1,j}+w_6*E_{i+1,j+1}$ and, at least one of: (i) the sum: $w_1*E_{i-1,j-1}+w_4*E_{i+1,j-1}$ and (ii) the sum: $w_3*E_{i-1,j+1}+w_6*E_{i-1,j+1}$; wherein $w_1,w_2, w_3, w_4, w_5$, and $w_6$, are weighted apportionments given to a set of tone quantization error remainders; and
      determine, for each pixel in series j, and per color channel, a total quantization error, or $D_{i,j}$, based on the assigned pixel tone level of the pixel, or $S_{i,j}$, and the quantized assigned pixel tone level of the pixel, or $Q_{i,j}$, wherein the total quantization error, or $D_{i,j}$, comprises a partial tone quantization error, or $N_{i,j}$.

10. The processor readable non-transitory medium having processor executable instructions thereon of claim 9 which, when executed by a processor cause the processor to:
   divide the assigned pixel tone level of each pixel, or $S_{i,j}$, by $2^B+1$ to generate a quotient having an integer component, wherein B is an integer value to indicate a binary integer of length B;
   add unity to the integer component of the quotient to generate a quantized tone value; and
   test to maintain the quantized tone value at least a value of unity and no more a value than $2^B$; and wherein if the assigned pixel tone level of each pixel, or $S_{i,j}$, is an eight-bit integer, then B=4, and the quantized pixel tone level, or $Q_{i,j}$, is a four-bit integer.

11. The processor readable non-transitory medium having processor executable instructions thereon of claim 10 which, when executed by a processor cause the processor to assign the total quantization error, or $D_{i,j}$, the value of: the assigned pixel tone level of each pixel, or $S_{i,j}$, plus $(2^B+1)$, and less the value of the product of quantized pixel tone level, or $Q_{i,j}$, and $(2^B+1)$.

* * * * *

UNITED STATES PATENT AND TRADEMARK OFFICE
CERTIFICATE OF CORRECTION

PATENT NO.         : 8,274,705 B2                                                     Page 1 of 1
APPLICATION NO.    : 12/412648
DATED              : September 25, 2012
INVENTOR(S)        : Ching-Wei Chang It is certified that error appears in the above-identified patent and that said Letters Patent is hereby corrected as shown below:

Column 2, line 4
replace "one" with "tone"

Signed and Sealed this
Fourth Day of December, 2012

David J. Kappos
*Director of the United States Patent and Trademark Office*